United States Patent
Kahlon et al.

(10) Patent No.: US 9,223,319 B2
(45) Date of Patent: Dec. 29, 2015

(54) HIGH DILUTION RATIO BY SUCCESSIVELY PREPARING AND DILUTING CHEMICALS

(71) Applicant: Intermolecular, Inc., San Jose, CA (US)

(72) Inventors: Satbir Kahlon, Livermore, CA (US); Jeffrey Chih-Hou Lowe, Cupertino, CA (US); Wen-Guang Yu, Zhubei (TW)

(73) Assignee: Intermolecular, Inc., San Jose, CA (US)

( * ) Notice: Subject to any disclaimer, the term of this patent is extended or adjusted under 35 U.S.C. 154(b) by 531 days.

(21) Appl. No.: 13/724,786

(22) Filed: Dec. 21, 2012

(65) Prior Publication Data

US 2014/0177378 A1    Jun. 26, 2014

(51) Int. Cl.
*G05D 11/13*    (2006.01)

(52) U.S. Cl.
CPC ................. *G05D 11/138* (2013.01)

(58) Field of Classification Search
CPC ............ G05D 11/13; G05D 11/131–11/138; B67D 1/0007
USPC ............... 366/132, 134, 160.5, 177.1, 182.4; 222/132
See application file for complete search history.

(56) References Cited

U.S. PATENT DOCUMENTS

| | | | |
|---|---|---|---|
| 3,188,181 A | | 6/1965 | Peterson et al. |
| 3,536,449 A | | 10/1970 | Astle |
| 3,990,313 A | | 11/1976 | Bjorklund et al. |
| 4,332,483 A | * | 6/1982 | Hope et al. ................... 366/132 |
| 4,622,988 A | * | 11/1986 | Takimoto et al. ............. 137/209 |
| 5,077,017 A | * | 12/1991 | Gorin et al. ................... 422/514 |
| 5,454,408 A | * | 10/1995 | DiBella et al. ................ 141/197 |
| 6,305,835 B1 | * | 10/2001 | Farrar et al. ................. 366/162.4 |
| 7,810,516 B2 | * | 10/2010 | Gerken ........................ 137/113 |
| 8,037,894 B1 | * | 10/2011 | Kelekar et al. .................. 137/12 |
| 8,226,908 B2 | | 7/2012 | Zucchelli et al. |
| 2003/0105553 A1 | * | 6/2003 | McClure et al. .............. 700/231 |
| 2007/0186983 A1 | * | 8/2007 | Ding et al. .................. 137/487.5 |
| 2010/0139777 A1 | * | 6/2010 | Whiteman ..................... 137/14 |
| 2012/0076935 A1 | * | 3/2012 | Ding et al. .................. 427/248.1 |

* cited by examiner

*Primary Examiner* — David Sorkin
*Assistant Examiner* — Abbas Rashid

(57) ABSTRACT

A system and method for providing a plurality of diluted solutions are disclosed. Successive dilution operations are performed upon mixing vessels substantially simultaneously. Measured source volumes of a source solution are placed into the mixing vessels. First measured volumes of a liquid are added to the mixing vessels. Measured first waste volumes are dispensed from the mixing vessels. Second measured volumes of the liquid are added to the mixing vessels. Measured second waste volumes are dispensed from the mixing vessels. Third measured volumes of the liquid are added to the mixing vessels. Each vessel has an individual target dilution ratio. Measured volumes and number of dilution operations are individual to each of the mixing vessels.

10 Claims, 6 Drawing Sheets

HIGH DILUTION RATIO BY SUCCESSIVELY PREPARING AND DILUTING CHEMICALS

BACKGROUND

Chemical solutions are used in a vast variety of industrial and research processes. Often there is a need for chemical solutions of diverse dilution ratios for batch processes in experiments, in which an optimal dilution ratio for a specified chemical solution and chemical reaction or processing step is sought. Purchase of numerous containers of differing dilution ratios from chemical solution supply source, and storage of such containers, is one option available to personnel. Another option is individually preparing diluted mixes to a specification. Each of these possibilities is time and resource-consuming. In addition, when dealing with relatively small fluid amounts, the systems tend to be limited in the volume accuracy at the relatively small fluid amounts. This accuracy limitation constrains the maximum dilution that can be accurately achieved. Therefore, there is a need in the art for a solution which overcomes the drawbacks described above.

SUMMARY

High dilution ratios of a chemical solution are produced by performing successive dilutions substantially simultaneously. Embodiments of a system and a method are disclosed herein.

Some embodiments include a method for providing a plurality of diluted solutions. Measured source volumes of a source solution are placed into mixing vessels. A volume of a source solution is placed into each mixing vessel of a plurality of mixing vessels. A first volume of a liquid is added to each mixing vessel of a plurality of mixing vessels to form first diluted solutions having first dilution ratios in each mixing vessel. For a portion of the plurality of mixing vessels, a first waste volume of the first diluted solutions is dispensed from the mixing vessels. For the portion of the plurality of mixing vessels, adding a second volume of the liquid to form second diluted solutions having second dilution ratios in each of the portion of the plurality of mixing vessels. For a subset of the portion of the plurality of mixing vessels, a second waste volume of the second diluted solutions is dispensed. For the subset of the portion of the plurality of mixing vessels, a third volume of the liquid is added to form third diluted solutions having third dilution ratios in each of the subset of the portion of the plurality of mixing vessels, wherein the adding the first volume, the dispensing the first waste volume and the adding the second volume are performed substantially simultaneously.

Some embodiments include a method for providing a plurality of diluted solutions. A respective target dilution ratio is determined for each of a plurality of mixing vessels. For each of the mixing vessels, substantially simultaneously across the mixing vessels the following operations are performed. A measured source volume of a source solution is placed in the mixing vessel. A first measured volume of a liquid is added to the mixing vessel. This forms a first diluted solution having a first dilution ratio. In response to the first dilution ratio being insufficiently dilute for the target dilution ratio, a measured first waste volume of the first diluted solution is dispensed. A second measured volume of the liquid to the mixing vessel is added to form a second diluted solution having a second dilution ratio. In response to the second dilution ratio being insufficiently dilute for the target dilution ratio, a measured second waste volume of the second diluted solution is dispensed. A third measured volume of the liquid is added to the mixing vessel to form a third diluted solution having a third dilution ratio, wherein at least one of the measured source volume, the first measured volume, the second measured volume or the third measured volume is individually dispensed substantially simultaneously to respective mixing vessels through respective electronic syringes.

Some embodiments include a diluted solutions dispensing system. The system includes a plurality of mixing vessels. A plurality of source inlet valves is included. A plurality of liquid inlet valves is included. The liquid inlet valves are configured to provide a liquid to the respective mixing vessels. A plurality of outlet valves is included. The outlet valves are configured to dispense from the respective mixing vessels. A controller is included. The controller communicates with the source inlet valves, the gas inlet valves, the liquid inlet valves and the outlet valves. The controller is configured to dispense various volumes. Measured source volumes of the source solution are dispensed from the source inlet valves into the mixing vessels. First measured volumes of different liquids are dispensed from the liquid inlet valves to the mixing vessels. This forms first diluted solutions having first dilution ratios. Measured first waste volumes of the first diluted solutions are dispensed from the mixing vessels through the outlet valves. Second measured volumes of the liquid are dispensed from the liquid inlet valves to the mixing vessels. This forms second diluted solutions having second dilution ratios. Measured second waste volumes of the second diluted solutions are dispensed from the mixing vessels through the outlet valves. Third measured volumes of the liquid are dispensed from the liquid inlet valves to the mixing vessels. This forms third diluted solutions having third dilution ratios, wherein the first, second and third dilution ratios are individually set to each mixing vessel of the plurality of mixing vessels, and wherein each successive dilution operation is performed upon the plurality of mixing vessels substantially simultaneously.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
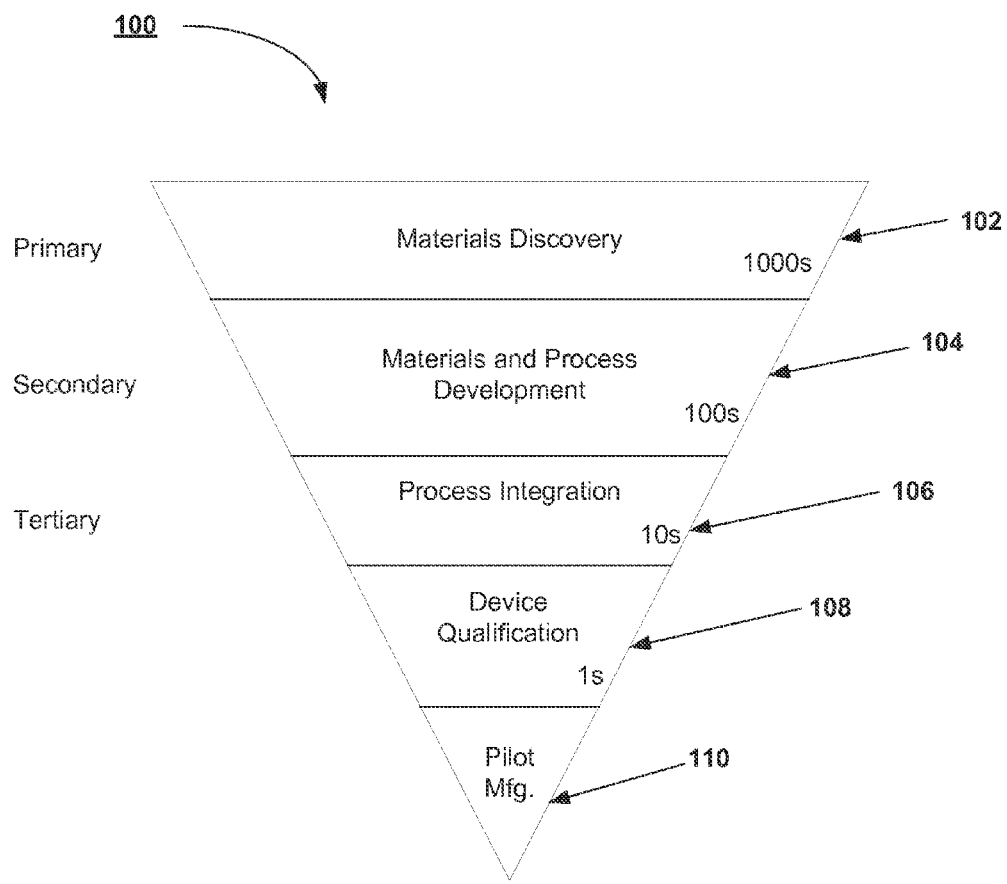
FIG. 1A is a schematic diagram showing combinatorial processing and evaluation.

A chemical solution dispensing system operable to perform successive dilutions substantially simultaneously and dispenses multiple diluted solutions, each individually controlled to a respective dilution ratio is provided. Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

Semiconductor manufacturing typically includes a series of processing steps such as cleaning, surface preparation, deposition, patterning, etching, thermal annealing, and other related unit processing steps. The precise sequencing and integration of the unit processing steps enables the formation of functional devices meeting desired performance metrics such as efficiency, power production, and reliability.

As part of the discovery, optimization and qualification of each unit process, it is desirable to be able to i) test different materials, ii) test different processing conditions within each unit process module, iii) test different sequencing and integration of processing modules within an integrated processing tool, iv) test different sequencing of processing tools in executing different process sequence integration flows, and combinations thereof in the manufacture of devices such as integrated circuits. In particular, there is a need to be able to test i) more than one material, ii) more than one processing condition, iii) more than one sequence of processing conditions, iv) more than one process sequence integration flow, and combinations thereof, collectively known as "combinatorial process sequence integration", on a single monolithic substrate without the need of consuming the equivalent number of monolithic substrates per material(s), processing condition(s), sequence(s) of processing conditions, sequence(s) of processes, and combinations thereof. This can greatly improve both the speed and reduce the costs associated with the discovery, implementation, optimization, and qualification of material(s), process(es), and process integration sequence(s) required for manufacturing.

Systems and methods for High Productivity Combinatorial (HPC) processing are described in U.S. Pat. No. 7,544,574 filed on Feb. 10, 2006, U.S. Pat. No. 7,824,935 filed on Jul. 2, 2008, U.S. Pat. No. 7,871,928 filed on May 4, 2009, U.S. Pat. No. 7,902,063 filed on Feb. 10, 2006, and U.S. Pat. No. 7,947,531 filed on Aug. 28, 2009 which are all herein incorporated by reference. Systems and methods for HPC processing are further described in U.S. patent application Ser. No. 11/352,077 filed on Feb. 10, 2006, claiming priority from Oct. 15, 2005, U.S. patent application Ser. No. 11/419,174 filed on May 18, 2006, claiming priority from Oct. 15, 2005, U.S. patent application Ser. No. 11/674,132 filed on Feb. 12, 2007, claiming priority from Oct. 15, 2005, and U.S. patent application Ser. No. 11/674,137 filed on Feb. 12, 2007, claiming priority from Oct. 15, 2005 which are all herein incorporated by reference.

HPC processing techniques have been successfully adapted to wet chemical processing such as etching and cleaning HPC processing techniques have also been successfully adapted to deposition processes such as physical vapor deposition (PVD), atomic layer deposition (ALD), and chemical vapor deposition (CVD).

FIG. 1A illustrates a schematic diagram, 100, for implementing combinatorial processing and evaluation using primary, secondary, and tertiary screening. The schematic diagram, 100, illustrates that the relative number of combinatorial processes run with a group of substrates decreases as certain materials and/or processes are selected. Generally, combinatorial processing includes performing a large number of processes during a primary screen, selecting promising candidates from those processes, performing the selected processing during a secondary screen, selecting promising candidates from the secondary screen for a tertiary screen, and so on. In addition, feedback from later stages to earlier stages can be used to refine the success criteria and provide better screening results.

For example, thousands of materials are evaluated during a materials discovery stage, 102. Materials discovery stage, 102, is also known as a primary screening stage performed using primary screening techniques. Primary screening techniques may include dividing substrates into coupons and depositing materials using varied processes. The materials are then evaluated, and promising candidates are advanced to the secondary screen, or materials and process development stage, 104. Evaluation of the materials is performed using metrology tools such as electronic testers and imaging tools (i.e., microscopes).

The materials and process development stage, 104, may evaluate hundreds of materials (i.e., a magnitude smaller than the primary stage) and may focus on the processes used to deposit or develop those materials. Promising materials and processes are again selected, and advanced to the tertiary screen or process integration stage, 106, where tens of materials and/or processes and combinations are evaluated. The tertiary screen or process integration stage, 106, may focus on integrating the selected processes and materials with other processes and materials.

The most promising materials and processes from the tertiary screen are advanced to device qualification, 108. In device qualification, the materials and processes selected are evaluated for high volume manufacturing, which normally is conducted on full substrates within production tools, but need not be conducted in such a manner. The results are evaluated to determine the efficacy of the selected materials and processes. If successful, the use of the screened materials and processes can proceed to pilot manufacturing, 110.

The schematic diagram, 100, is an example of various techniques that may be used to evaluate and select materials and processes for the development of new materials and processes. The descriptions of primary, secondary, etc. screening and the various stages, 102-110, are arbitrary and the stages may overlap, occur out of sequence, be described and be performed in many other ways.

This application includes High Productivity Combinatorial (HPC) techniques described in U.S. patent application Ser. No. 11/674,137 filed on Feb. 12, 2007 which is hereby incorporated for reference in its entirety. Portions of the '137 application have been reproduced below to enhance the understanding of the present invention. The embodiments described herein enable the application of combinatorial techniques to process sequence integration in order to arrive at a globally optimal sequence of semiconductor manufacturing operations by considering interaction effects between the unit manufacturing operations, the process conditions used to effect such unit manufacturing operations, hardware details used during the processing, as well as materials characteristics of components utilized within the unit manufacturing operations. Rather than only considering a series of local optimums, i.e., where the best conditions and materials for each manufacturing unit operation is considered in isolation, the embodiments described below consider interactions effects introduced due to the multitude of processing operations that are performed and the order in which such multitude of processing operations are performed when fabricating a device. A global optimum sequence order is therefore derived and as part of this derivation, the unit processes, unit process parameters and materials used in the unit process operations of the optimum sequence order are also considered.

The embodiments described further analyze a portion or sub-set of the overall process sequence used to manufacture a semiconductor device. Once the subset of the process sequence is identified for analysis, combinatorial process sequence integration testing is performed to optimize the materials, unit processes, hardware details, and process sequence used to build that portion of the device or structure. During the processing of some embodiments described herein, structures are formed on the processed substrate that are equivalent to the structures formed during actual production of the semiconductor device. For example, such structures may include, but would not be limited to, contact layers, buffer layers, absorber layers, or any other series of layers or unit processes that create an intermediate structure found on semiconductor devices. While the combinatorial processing varies certain materials, unit processes, hardware details, or process sequences, the composition or thickness of the layers or structures or the action of the unit process, such as cleaning, surface preparation, deposition, surface treatment, etc. is substantially uniform through each discrete region. Furthermore, while different materials or unit processes may be used for corresponding layers or steps in the formation of a structure in different regions of the substrate during the combinatorial processing, the application of each layer or use of a given unit process is substantially consistent or uniform throughout the different regions in which it is intentionally applied. Thus, the processing is uniform within a region (inter-region uniformity) and between regions (intra-region uniformity), as desired. It should be noted that the process can be varied between regions, for example, where a thickness of a layer is varied or a material may be varied between the regions, etc., as desired by the design of the experiment.

The result is a series of regions on the substrate that contain structures or unit process sequences that have been uniformly applied within that region and, as applicable, across different regions. This process uniformity allows comparison of the properties within and across the different regions such that the variations in test results are due to the varied parameter (e.g., materials, unit processes, unit process parameters, hardware details, or process sequences) and not the lack of process uniformity. In the embodiments described herein, the positions of the discrete regions on the substrate can be defined as needed, but are preferably systematized for ease of tooling and design of experimentation. In addition, the number, variants and location of structures within each region are designed to enable valid statistical analysis of the test results within each region and across regions to be performed.

Figure 1B:
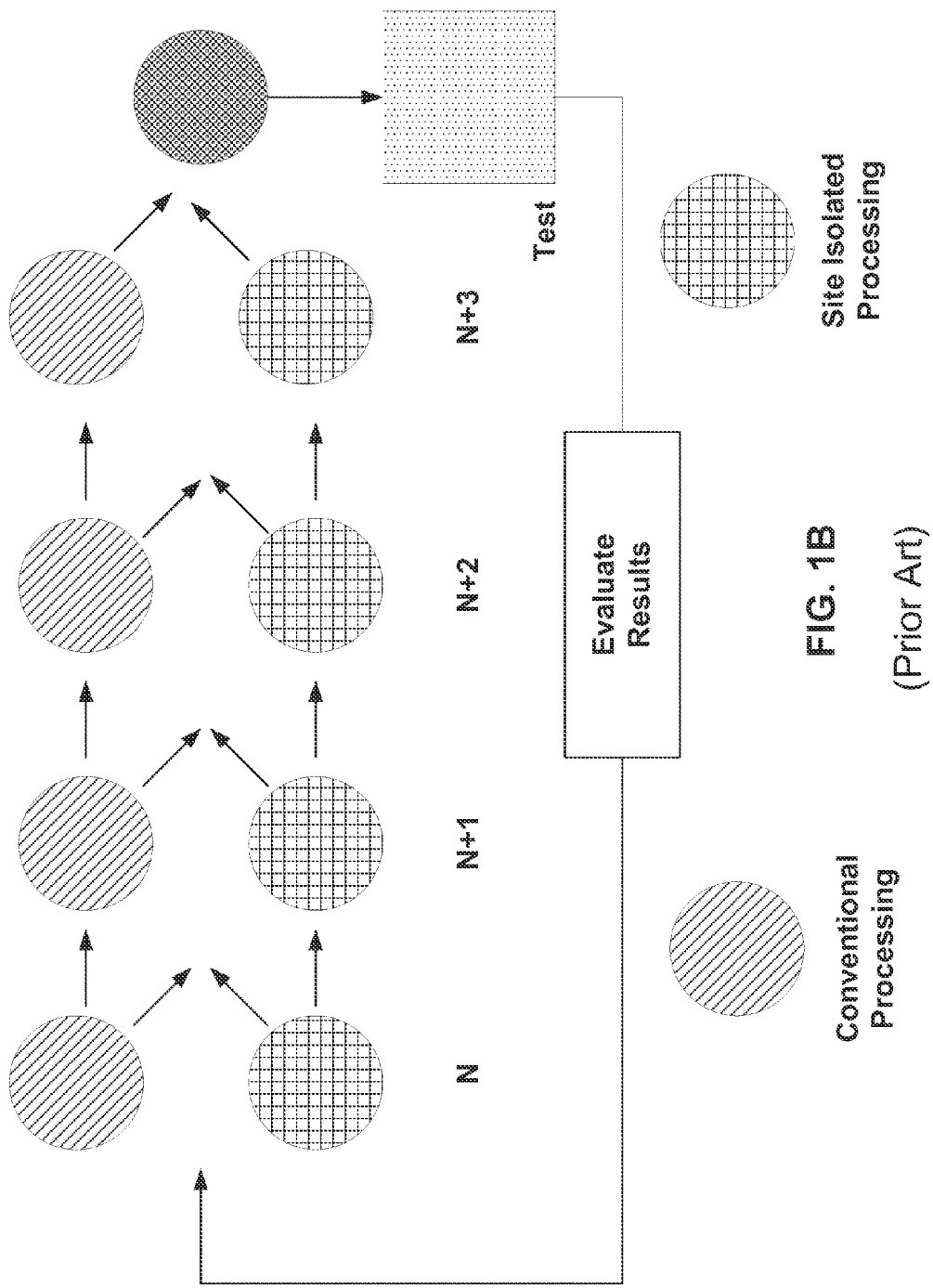
FIG. 1B is a schematic diagram showing a methodology for combinatorial process sequence integration.

FIG. 1B is a simplified schematic diagram illustrating a general methodology for combinatorial process sequence integration that includes site isolated processing and/or conventional processing in accordance with one embodiment of the invention. In one embodiment, the substrate is initially processed using conventional process N. In one exemplary embodiment, the substrate is then processed using site isolated process N+1. During site isolated processing, an HPC module may be used, such as the HPC module described in U.S. patent application Ser. No. 11/352,077 filed on Feb. 10, 2006. The substrate can then be processed using site isolated process N+2, and thereafter processed using conventional process N+3. Testing is performed and the results are evaluated. The testing can include physical, chemical, acoustic, magnetic, electrical, optical, etc. tests. From this evaluation, a particular process from the various site isolated processes (e.g. from steps N+1 and N+2) may be selected and fixed so that additional combinatorial process sequence integration may be performed using site isolated processing for either process N or N+3. For example, a next process sequence can include processing the substrate using site isolated process N, conventional processing for processes N+1, N+2, and N+3, with testing performed thereafter.

It should be appreciated that various other combinations of conventional and combinatorial processes can be included in the processing sequence with regard to FIG. 1B. That is, the combinatorial process sequence integration can be applied to any desired segments and/or portions of an overall process flow. Characterization, including physical, chemical, acoustic, magnetic, electrical, optical, etc. testing, can be performed after each process operation, and/or series of process operations within the process flow as desired. The feedback provided by the testing is used to select certain materials, processes, process conditions, and process sequences and eliminate others. Furthermore, the above flows can be applied to entire monolithic substrates, or portions of monolithic substrates such as coupons.

Under combinatorial processing operations the processing conditions at different regions can be controlled independently. Consequently, process material amounts, reactant species, processing temperatures, processing times, processing pressures, processing flow rates, processing powers, processing reagent compositions, the rates at which the reactions are quenched, deposition order of process materials, process sequence steps, hardware details, etc., can be varied from region to region on the substrate. Thus, for example, when exploring materials, a processing material delivered to a first and second region can be the same or different. If the processing material delivered to the first region is the same as the processing material delivered to the second region, this processing material can be offered to the first and second regions on the substrate at different concentrations. In addition, the material can be deposited under different processing parameters. Parameters which can be varied include, but are not limited to, process material amounts, reactant species, processing temperatures, processing times, processing pressures, processing flow rates, processing powers, processing reagent compositions, the rates at which the reactions are quenched, atmospheres in which the processes are conducted, an order in which materials are deposited, hardware details of the gas distribution assembly, etc. It should be appreciated that these process parameters are exemplary and not meant to be an exhaustive list as other process parameters commonly used in semiconductor manufacturing may be varied.

As mentioned above, within a region, the process conditions are substantially uniform, in contrast to gradient processing techniques which rely on the inherent non-uniformity of the material deposition. That is, the embodiments, described herein locally perform the processing in a conventional manner, e.g., substantially consistent and substantially uniform, while globally over the substrate, the materials, processes, and process sequences may vary. Thus, the testing will find optimums without interference from process variation differences between processes that are meant to be the same. It should be appreciated that a region may be adjacent to another region in one embodiment or the regions may be isolated and, therefore, non-overlapping. When the regions are adjacent, there may be a slight overlap wherein the materials or precise process interactions are not known, however, a portion of the regions, normally at least 50% or more of the area, is uniform and all testing occurs within that region. Further, the potential overlap is only allowed with material of processes that will not adversely affect the result of the tests. Both types of regions are referred to herein as regions or discrete regions.

Figure 2A:
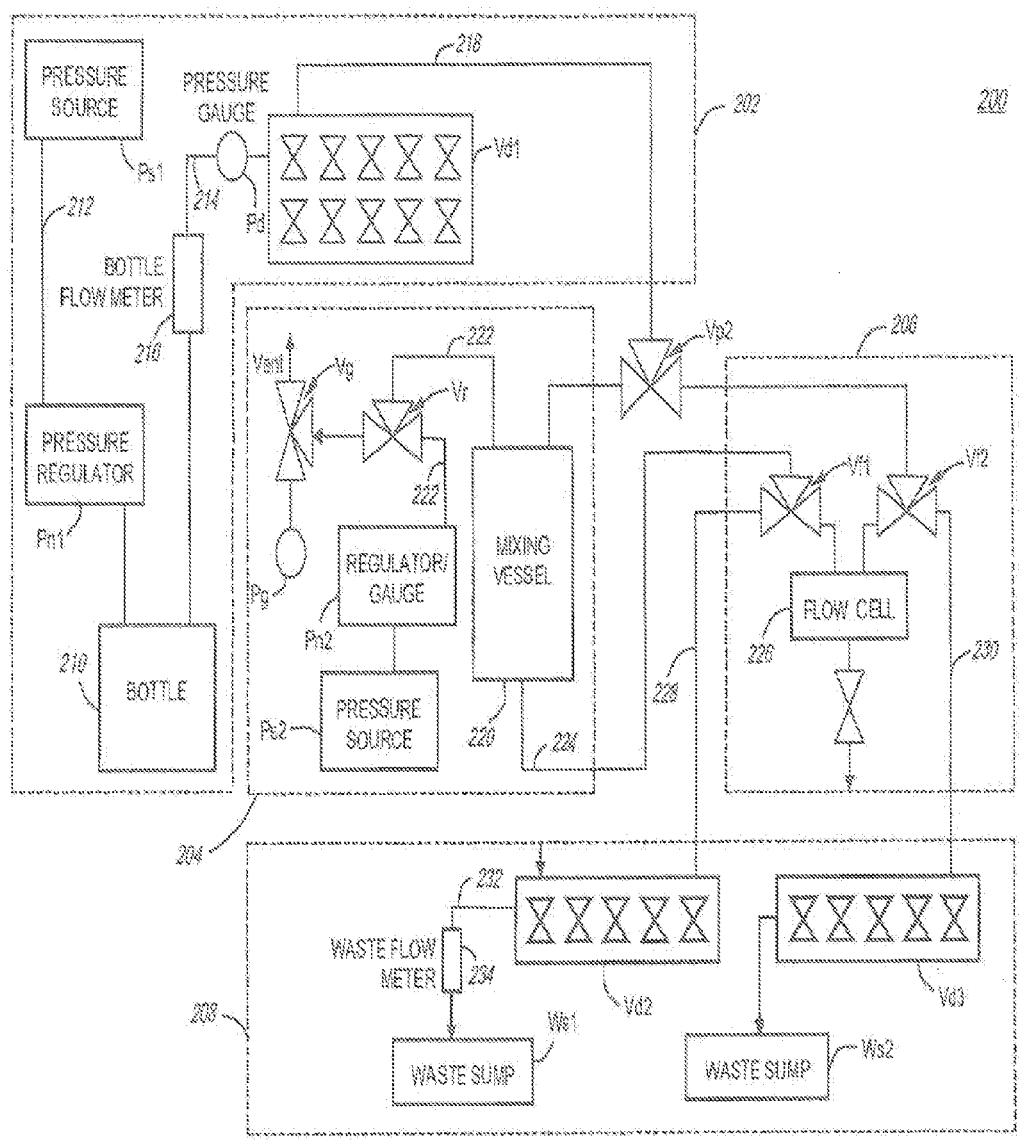
FIGS. 2A and 2B are schematic diagrams of a mixing apparatus in accordance with an embodiment of the present invention.
Figure 2B:
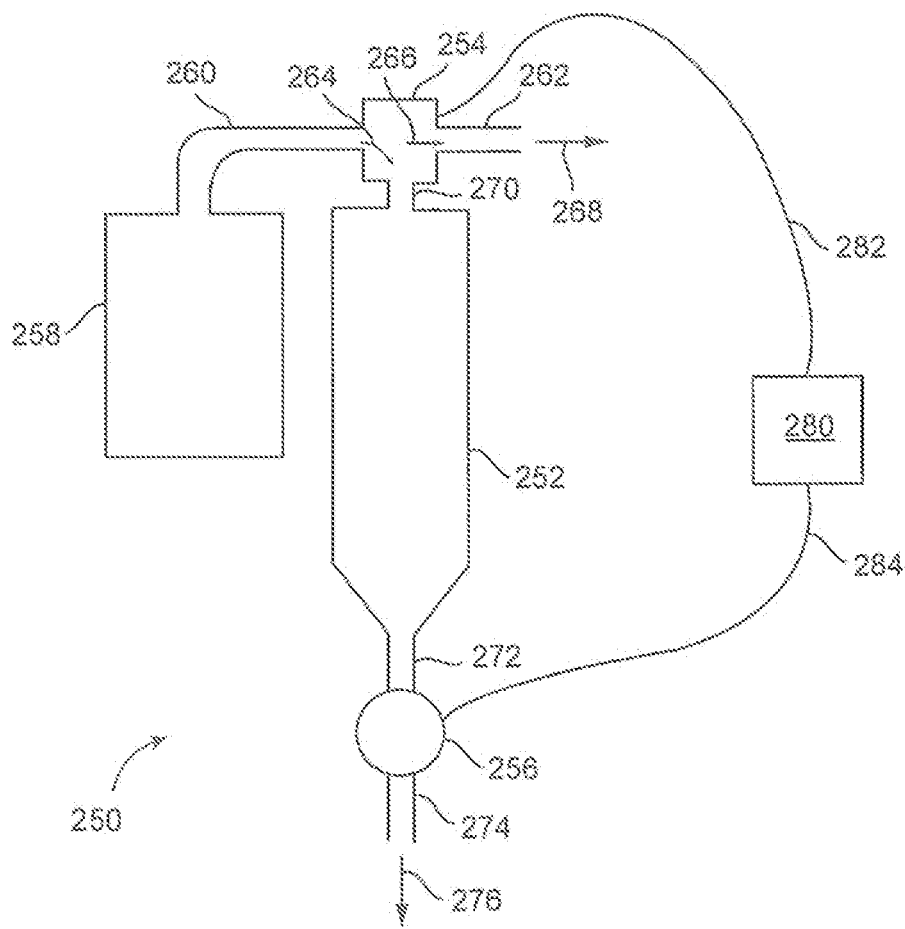

With reference to FIGS. 2A and 2B, a mixing apparatus in accordance with some embodiments is herein described. FIG. 2A illustrates a schematic diagram of a combinatorial processing tool 200 according to implementations of one or more technologies described herein. The combinatorial processing tool 200 illustrated in FIG. 2A may be a wet processing tool and may be a portion of a larger combinatorial processing tool, such as the wet processing tools of the assignee. Portions of the combinatorial processing tool 200 may be replicated several times within a larger combinatorial processing tool such that a larger number of variations in substrate processing conditions may be achieved.

The combinatorial processing tool 200 illustrated in FIG. 2A may be divided into four parts. A chemical supply portion 202 may supply chemicals to a chemical mixing portion 204 and a site isolated reactor portion 206. The chemical mixing portion 204 may be used for mixing various chemicals, e.g., liquid chemicals, into solutions which may be applied to various locations on a substrate in the reactor portion 206. The reactor portion 206 may contain a site isolated reactor and may apply the solutions to the substrate or portions of the substrate and may subject the substrate or portions thereof to various processing conditions. The reactor portion 206 may be coupled to a waste portion 208 of the combinatorial processing tool 200. The waste portion 208 may be used to capture waste chemicals from the substrate processing.

The supply portion 202 of the combinatorial processing tool 200 may include a bottle 210 containing a liquid chemical. The chemical may be applied to the substrate or may be mixed with another chemical to form a solution which is to be applied to the substrate. As illustrated in FIG. 2A, a pressure source PS1 and a pressure regulator Pn1 may be coupled to the bottle 210 via a pressure supply line 212. Together the pressure source PS1 and the pressure regulator Pn1 may provide a pressurized gas, such as Nitrogen, at a regulated pressure to the bottle 210 via the supply line 212. In this manner, the pressurized gas may be used to push the liquid chemical out of the bottle 210 and into a line 214 connecting the bottle 210 to a supply manifold Vd1. A flow meter 216 and a pressure transducer Pd may be coupled to the line 214. The flow meter 216 may monitor the flow rate of liquids through the line 214 and the pressure gauge Pd may monitor the pressure within the line 214.

The supply manifold Vd1 may contain a plurality of two-way and/or multi way valves connecting the bottle 210 to a plurality of mixing cells/vessels within the combinatorial processing tool 200. Furthermore, in lieu of a single bottle 210, a plurality of bottles containing various chemicals may be coupled to the supply manifold Vd1 such that the supply manifold Vd1 may supply various chemicals to multiple mixing portions or multiple site isolated reactor portions of the combinatorial processing tool 200. Additionally, in lieu of a single supply manifold Vd1, a plurality of supply manifolds Vd1 may be present in the combinatorial processing tool 200. Together the plurality of bottles, valves, and supply manifolds may enable the supply of various chemicals and chemical mixtures to the mixing portion 204 and the site isolated reactor portion 206 of the combinatorial processing tool 200.

The line 214 coupling the bottle 210 to the supply manifold Vd1 may be coupled to a valve, e.g., a multi-way valve, within the supply manifold Vd1 such that the supply manifold Vd1 may control the flow of chemicals from the bottle 210 to the mixing portion 204 or the reactor portion 206 of the combinatorial processing tool 200. The output of the valve in the supply manifold Vd1 may be coupled via a line 218 to a valve Vp2. The valve Vp2 may be a multi-way valve which controls the flow of fluids/chemicals from the supply manifold Vd1 into either the mixing portion 204, site-isolated reactor portion 206, or both.

The mixing portion 204 of the combinatorial processing tool 200 is provided to allow thorough solution mixing of chemicals provided by supply portions. In order to form a solution, a plurality of chemicals may flow from the supply portion 202, e.g., the bottle 210, into different mixing vessels in the mixing portion 204. The mixing vessel 220 may then mix the chemicals to form solutions. The mixing portion 204 may also provide accurate temperature and pH control of a solution being mixed in the mixing portion 204.

A pressure source Ps2 and a pressure regulator Pn2 may be coupled to the mixing vessel 220 via a valve Vr and a supply line 222. Together the pressure source PS2 and the pressure regulator Pn2 may provide a pressurized gas, e.g., Nitrogen, at a regulated pressure to the mixing vessel 220 via the valve Vr and the supply line 222. An outlet of the valve Vr may be coupled to another valve Vg to vent pressure within the supply line 222. The pressure in the supply line 222 may be measured by a pressure transducer Pg.

The pressurized gas provided by the pressure source Ps2 and the pressure regulator Pn2 may push the mixed chemicals in the mixing vessel 220 through a line 224 and into the site-isolated reactor portion 206 of the combinatorial processing tool 200. The mixed chemicals may flow through a valve Vf1 and into a flow cell 226. The flow cell 226 may be one portion of a site isolated reactor, and may be used to apply the mixed chemicals to a portion or portions of a substrate under processing in the site-isolated reactor portion 206 of the combinatorial processing tool 200. The flow cell 226 may be one of a series of parallel cells forming site-isolated reactors which may be configured to effect site-isolated processing on proximate regions on the substrate. Each of the flow cells may be configured to effect site isolated processing, for example, by flowing fluids (e.g., mixed chemicals) onto proximate regions on the substrate. Chemicals may be provided to the flow cell 226 and, consequently, to a substrate via the supply manifold Vd1.

A rate of fluid flow into the flow cell 226 may be calibrated before the tool 200 is used so that the combinatorial processing of the tool 200 is reliable and so that the multiple regions (e.g., regions 122) of a substrate can be compared. The techniques described herein monitor pressure within a supply line of the combinatorial processing tool 200 and adjust pressure in the bottle 210 to maintain a constant fluid flow rate into the flow cell 226. The flow rate out of the bottle changes with changes in pressure. Thus, maintaining a consistent pressure within a supply line of the combinatorial processing tool 200 can be used to maintain fluid flow rate calibration of the tool 200.

After exposing the substrate to the desired amount of chemicals, unused chemicals may exit the flow cell 226 through valve Vf1 and waste line 228 or through valve Vf2 and waste line 230. Waste line 228 may be coupled to a waste manifold Vd2, and waste line 230 may be coupled to waste manifold Vd3. The waste manifolds may be coupled to waste sumps (e.g., waste sump Ws1 and waste sump Ws2) and the waste manifolds may be used to divert chemicals into specific waste sumps. A waste line 232 may couple a waste manifold Vd2 to a waste sump Ws1. Furthermore, a waste flow meter 234 may be coupled to the waste line 232 to measure a flow rate of waste liquids flowing into the waste sump Ws1.

The flow meters (e.g., flow meter 216 and flow meter 234) may be any type of flow meter available. For example, the flow meters may be ultrasonic flow meters which measure the travel time of ultrasonic waves through a liquid and calculates a flow rate of the liquid based on the measured travel time of the ultrasonic waves. The flow meters may also be magnetic flow meters which measure changes in a magnetic field applied to a liquid to determine a rate of liquid flow. As described above, the supply portion 202 of the combinatorial processing tool 200 may supply fluids (e.g., liquid chemicals) to the mixing portion 204 and the reactor portion 206 of the combinatorial processing tool 200. For example, the bottle 210 may supply a fluid via the supply line 214 and the supply manifold Vd1 to the mixing portion 204 and the reactor portion 206 of the combinatorial processing tool 200. In some embodiments, an external mixing tank is coupled to mixing vessel 220 and a pump moves a measured amount of a liquid from the external mixing tank to the mixing vessel 220.

With reference to FIG. 2B, a mixing apparatus 250 is shown. It should be appreciated that mixing apparatus 250 may be substituted for mixing portion 204 of FIG. 2A in some embodiments. Multiples of the mixing apparatus 250 can be used in the diluted solutions dispensing system described herein. The mixing vessel 252 has an inlet 270 and an outlet 272. An outlet valve 256 is attached to the outlet 272 of the mixing vessel 252. The outlet valve 256 has a respective outlet 274, from which an outlet flow 276 may issue. A supply vessel 258 supplies a liquid or a gas, as appropriate to a specified action, through a supply tube 260 to an inlet and bypass valve 254. The inlet and bypass valve 254 can route an inlet flow 264 from the supply tube 260 into the mixing vessel 252, or a waste flow 266 from the valve 254 through a waste outlet 262, which exits as an exit flow 268. By substituting supply vessels 258, or connecting other sources to the supply tube 260, various liquids or gases can be introduced into the mixing vessel 252. Contents of the mixing vessel 252 can be mixed by a suitable mixing device integrated with the mixing vessel. In some embodiments, the inlet and bypass valve 254 and the outlet valve 256 are connected by control wires 282, 284 to a controller 280.

For each of the dilutions performed substantially simultaneously, a measured volume of a source solution is placed in the respective mixing vessel 220; 252. As used herein, the phrase "substantially simultaneously" will be understood to mean and be equivalent to "at the same time" or "concurrently". Those skilled in the art will understand that small deviations in time for the steps will still fall within the teachings of the present disclosure. A diluted solutions dispensing system has multiple mixing vessels 220; 252. The measured volume of the source solution to each mixing vessel is individually controlled and can differ across the parallel dilutions. A measured volume of deionized water is added to each mixing vessel, in a first dilution forming a first diluted solution. The measured volume of deionized water to each mixing vessel is individually controlled and can differ across the parallel dilutions. After mixing, the mixing vessels are pressurized, in one embodiment to about 3.5 pounds per square inch above ambient (3.5 psi) using nitrogen gas. A measured volume of the first diluted solution is dispensed in a waste flow, by opening a dispensing valve of the mixing vessel for a timed duration. The timed duration is set in accordance with an empirically observed flow rate of deionized water, using an established gas pressure applied to the mixing vessel. The timed duration, as associated with the measured volume of the first diluted solution dispensed from each mixing vessel, is individually controlled for each mixing vessel and can differ across the parallel dilutions. A measured volume of deionized water, to approximately equal the volume of first diluted solution dispensed to waste, is added to the mixing vessel, in a second dilution forming a second diluted solution, followed by mixing. If further dilution is requested or specified, a measured volume of the second diluted solution is dispensed by opening the dispensing valve for a timed duration, and adding deionized water in a third dilution to form a third diluted solution, followed by mixing.

In one embodiment, the measured volume of the source solution is between 1 mL and 40 mL inclusive, with 1 mL being a lowest accurately dispensable liquid volume for the dispensing system according to predetermined calibration standards and empirical testing. The lower bound of 1 mL as an accurately dispensable liquid volume is based upon accuracy-limiting factors of the system including tubing volume, valve chamber volume, liquid drop size and associated liquid drop volume. In one embodiment, the measured volume of deionized water added to each mixing vessel to form the first dilution is calculated so that the total volume of the first diluted solution is about 80 mL. In one embodiment, the measured volume of the first diluted solution dispensed to waste is about 40 mL, and a like volume is added to form the second diluted solution. In one embodiment, the measured volume of the second diluted solution dispensed to waste is about 40 mL, and a like volume is added to form the third diluted solution. These volumes provide up to 80:1 dilution for the first diluted solution (e.g. 1 mL of source solution plus 79 mL of deionized water), up to 160:1 dilution for the second diluted solution (e.g. 40 mL dispensed to waste plus 40 mL added deionized water), and up to 320:1 dilution (e.g. 40 mL dispensed to waste plus 40 mL added deionized water) for the third diluted solution. Accuracy will be further described in the specification.

Additional cycles of dispensing to waste and adding deionized water can create further dilution levels. In one embodiment, 28 mixing vessels are individually controlled to respective dilution ratios substantially simultaneously. Each mixing vessel is individually controlled as to the number of dilutions, the measured volume of the source solution, the measured volume of the first diluted solution dispensed to waste, the measured volume of the second diluted solution dispensed to waste and the measured volume of deionized water added for each serial dilution. For example, after three dilution operations have occurred substantially simultaneously across the mixing vessels, each mixing vessel may have accumulated zero, one, two or three dilutions and may have a solution with no dilution, or between 2:1 dilution and 320:1 dilution inclusive. All of the mixing vessels may have differing dilution ratios, or some may be equal and some differ etc.

Figure 3:
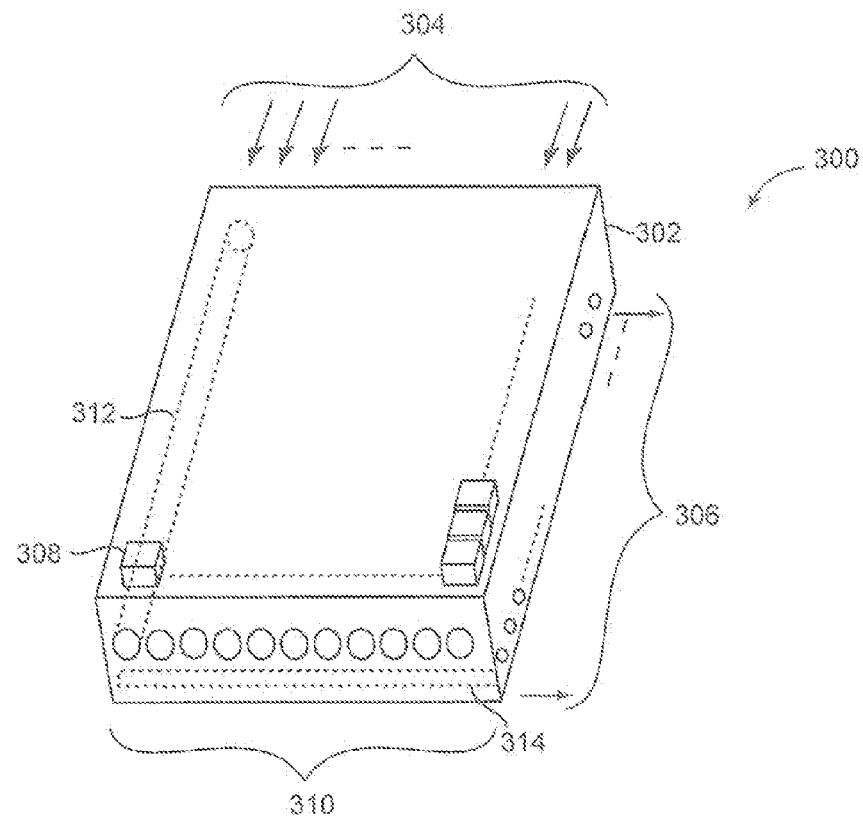
FIG. 3 is a perspective view of a dispense panel that can be used in an embodiment of the mixing apparatus of FIG. 1.

With reference to FIG. 3, a dispense panel 300 is shown. In some embodiments of the diluted solutions dispensing system, a dispense panel 300 is included and the various valves that route liquids and pressurized gas to the mixing vessels 352 are mounted to the dispense panel 300. Multiple supply flows 304, from gas and liquid supplies, are routed through supply passageways 312 (one shown in dashed line, others implied by dots) through the dispense panel 300. In some embodiments each supply passageway 312 is a bore through an otherwise solid block 302. Multiple exit flows 306 are routed from exit passageways 314 (one shown in dashed line, others implied by dots) through the dispense panel 300. In some embodiments each exit passageway 314 is a bore through the block 302. Crossconnect valves 308 are arrayed on the dispense panel 300 at intersections of the supply passageways 312 and the exit passageways 314. For example, one crossconnect valve 308 selectively connects the supply passageway 312 with the exit passageway 314, under control of the controller 280 (from FIG. 2B). In the embodiment shown in FIG. 3, four of the crossconnect valves 308 are shown for illustrative purposes, however, this is not meant to be limiting as any number of crossconnect valves may be utilized. In some embodiments, the dispense panel 300 has twenty-eight exit passageways 314, which connect to twenty-eight mixing vessels. In some embodiments, the dispense panel 300 has twelve supply passageways 312, which connect to nitrogen, deionized water, multiple chemical solution bottles, and vacuum. In some embodiments, the dispense panel has three hundred thirty-six crossconnect valves 308, which selectively connect twelve supply passageways 312 to twenty-eight exit passageways 314, under control of the controller 280.

Figure 4:
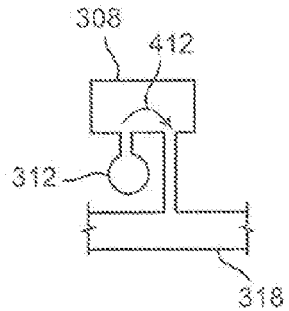
FIG. 4 is a schematic diagram of a valve that can be used in the dispense panel of FIG. 2.
Figure 5:
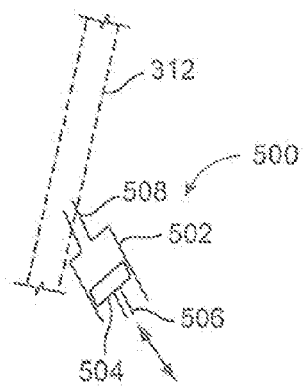
FIG. 5 is a schematic diagram of a syringe that can be used in the dispense panel of FIG. 2
Figure 6:
FIG. 6 is a schematic diagram of a waste valve that can be used in the dispense panel of FIG. 2.

FIGS. 4-6 show components used in some embodiments of the dispense panel 300. A crossconnect valve 308, shown in FIG. 4, selectively connects a supply passageway 312 with an exit passageway 318 (shown at right angle to the supply passageway), under control of the controller 280 (from FIG. 2B). When directed to connect the passageways, the crossconnect valve 308 opens and allows a flow 412 from the supply passageway 312 to the exit passageway 318. Cross connect valve 308 may be any suitable valve compatible with the processing chemicals and able to accommodate the flow rates and volumes for the system.

A syringe 500, shown in FIG. 5, can draw a measured amount in through the syringe nozzle 508 from a supply passageway 312 to which the syringe 500 is fluidly connected. The measured amount, e.g., of a liquid from the supply passageway 312, is controlled by displacement of a syringe piston 504 over a displacement in the syringe body 502. In some embodiments, the plunger shaft 506 is controlled by the controller 280 (from FIG. 2B), for example by an actuator mechanically connected to the plunger shaft 506 and electrically connected to the controller 280 of FIG. 2B. By reversing the direction of motion of the syringe piston 504, the measured amount can be released by the syringe 500. In some embodiments, the syringe 500 can draw the measured amount of a liquid from the supply passageway 510 when a crossconnect valve is closed, then release the measured amount when a crossconnect valve is open, and thereby deliver a measured amount of a supplied liquid to a selected one of the mixing vessels. In some embodiments, the dispense panel 300 of FIG. 3 has a plurality of syringes 500 of FIG. 5, where one syringe is located at each supply passageway 312. In some embodiments, the dispense panel 300 (from FIG. 3) has one syringe for each of the crossconnect valves 302. In some embodiments, each valve in the supply manifold Vd1 (shown in FIG. 2A) has a respective one of the syringes 500.

A waste valve shown in FIG. 6 is coupled to one of the supply passageways 312 at a respective one of the supply outlets 310 (as seen in FIG. 3). The waste valve can open to allow waste supply fluid to exit under control of the controller 280 of FIG. 2. The waste valve has an inlet tube 604, a valve 602, and an exit tube 606 through which an exit flow can pass. In some embodiments, the dispense panel 300 (of FIG. 3) has twelve waste valves, one for each of twelve supply passageways.

Figure 7:
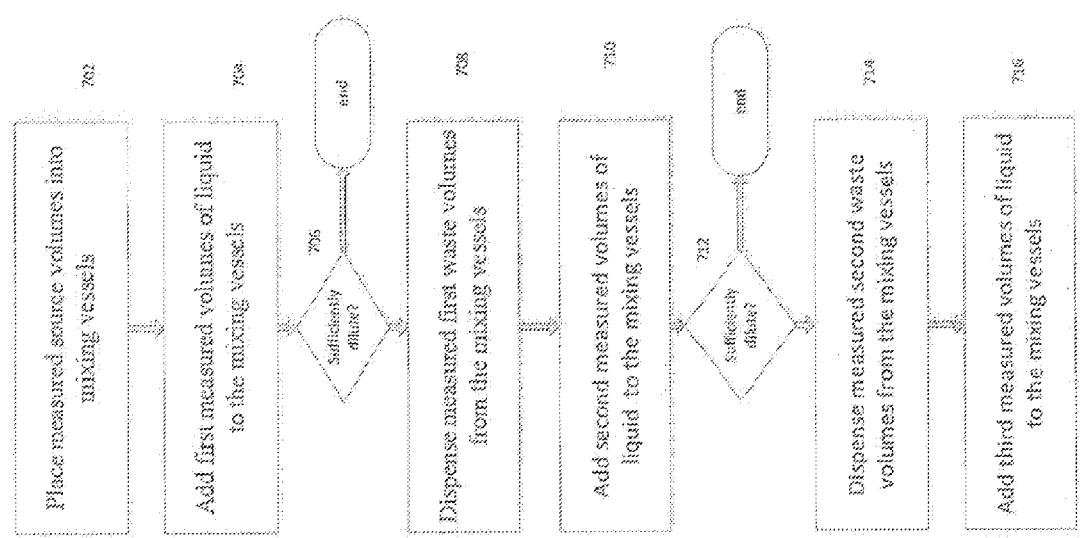
FIG. 7 is a flow diagram of an embodiment of a method for providing a plurality of diluted solutions, which can be performed on embodiments of the mixing apparatus of FIGS. 2A-6.

With reference to FIG. 7, an embodiment of a method 700 for providing a plurality of diluted solutions is shown. Multiple serial dilutions are performed substantially simultaneously, on an apparatus such as shown in FIG. 2A-FIG. 6, with multiple mixing vessels. In operation 702, measured source volumes are placed into mixing vessels. In some embodiments a chemical source solution may be delivered through an electronic syringe through a dispense panel into the mixing vessel. In operation 704, first measured volumes of liquid are added to the mixing vessels, forming first dilution ratios. In some embodiments the liquid is water and is provided to dilute the solution in each mixing vessel. In operation 706, it is determined whether the diluted solutions in the mixing vessels sufficiently dilute. If the diluted solutions are sufficiently dilute then the method terminates. If the diluted solutions are not sufficiently dilute then the method proceeds to operation 708.

In operation 708, measured first waste volumes are dispensed from the mixing vessels. In some embodiments, the waste volumes are dispensed after pressurizing the mixing vessel and opening a waste valve for a predetermined amount of time. In operation 710, second measured volumes of liquid are added to the mixing vessels, forming second dilution ratios. It should be appreciated that a portion of the first measured volume is sent to waste and the solution is further diluted through the addition of the liquid into the mixing vessel. In operation 712, it is determined whether the diluted solutions in the mixing vessel are sufficiently dilute. If the diluted solutions are sufficiently dilute, the method terminates. If the diluted solutions are not sufficiently dilute, the method proceeds to operation 714. In operation 714, measured second waste volumes are dispensed from the mixing vessels. As mentioned above with reference to operation 708, the mixing vessels may be pressurized and a waste valve opened to dispense the second waste volume. In operation 716, third measured volumes of liquid are added to the mixing vessels, forming third dilution ratios. It should be appreciated that the source volume, the first, second and/or third measured volumes may be delivered via an electronic syringe in some embodiments. It should be appreciated that for each mixing vessel, the first, second or third dilution ratio may correspond to a target dilution ratio and that the target dilution ratio, measured volumes, and number of dilution operations are individual to each mixing vessel. In addition, the dilution operations are performed substantially simultaneously as applicable with target dilution ratios in some embodiments. In some embodiments, a portion of the mixing vessels are diluted while another portion may not be diluted. In addition, for successive dilutions, a subset of the portion of mixing vessels may be further diluted while another subset of the portion of mixing vessels is not further diluted. It should be appreciated that the measured source volumes may be referred to as a first volume of a source solution, while the first second and third measured volumes may be referred to second, third and fourth volumes, respectively, of the liquid used to dilute the first volume of the source solution. Thus, the embodiments allow preparing higher dilution solutions within the system and enhance the capabilities of a combinatorial processing system to explore wider process regimes with respect to dilutions more efficiently.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A solutions dispensing system, comprising:
a plurality of mixing vessels;
a plurality of source inlet valves, each configured to provide a source solution to a respective one of the mixing vessels;
a plurality of liquid inlet valves, each configured to provide a liquid to the respective one of the mixing vessels;
a plurality of outlet valves, each configured to dispense from the respective one of the mixing vessels; and
a controller, communicating with the source inlet valves, the liquid inlet valves and the outlet valves, and configured to:
dispense first volumes of the source solution from the source inlet valves into the mixing vessels;
dispense second volumes of the liquid from the liquid inlet valves to the mixing vessels, to form first diluted solutions having first dilution ratios;
dispense first waste volumes of the first diluted solutions from the mixing vessels through the outlet valves;
dispense third volumes of the liquid from the liquid inlet valves to the mixing vessels to form second diluted solutions having second dilution ratios;
dispense second waste volumes of the second diluted solutions from the mixing vessels through the outlet valves;
dispense fourth volumes of the liquid from the liquid inlet valves to the mixing vessels to form third diluted solutions having third dilution ratios,
wherein the first, second and third dilution ratios are individually set to each mixing vessel of the plurality of mixing vessels, and wherein each successive dilution operation is performed upon the plurality of mixing vessels substantially simultaneously; and
a plurality of syringes arranged along at least one of the first plurality or the second plurality of passageways and configured to draw the first volume of the source solution and release the first volume of the source solution under direction of the controller, each of the plurality of syringes controlled individually for each mixing vessel.

2. The system of claim 1, further comprising:
a dispense panel having the plurality of source inlet valves, the plurality of liquid inlet valves, the plurality of outlet valves and a plurality of gas inlet valves arrayed therein.

3. The system of claim 2, wherein the dispense panel includes:
a first plurality of passageways configured to deliver a pressurized gas to the gas inlet valves, the source solution to the source inlet valves, and the liquid to the liquid inlet valves; and
a second plurality of passageways coupled to the mixing vessels;
wherein the gas inlet valves, the source inlet valves and the liquid inlet valves are disposed at intersections of the first plurality of passageways and the second plurality of passageways so as to fluidly couple the first plurality of passageways and the second plurality of passageways under direction of the controller.

4. The system of claim 1, wherein the controller is further configured to initiate pressurization of each of the plurality of mixing vessels.

5. The system of claim 1, wherein the liquid comprises water.

6. The system of claim 1, wherein:
the first volume is selectable in a range of about one to ten milliliters.

7. The system of claim 1, wherein:
the second, third, and fourth volumes are individually selectable in a range of about twenty to ninety milliliters.

8. The system of claim 1, wherein the controller is operable to select a subset of the plurality of mixing vessels for each dispense operation.

9. The system of claim 1, wherein the controller is operable to control a pressure within each mixing vessel between ambient and about one atmosphere above ambient.

10. The system of claim 9, wherein the pressure is about 3.5 pounds per square inch above ambient.

* * * * *